United States Patent
Song et al.

(10) Patent No.: US 6,580,542 B1
(45) Date of Patent: Jun. 17, 2003

(54) AUTOMATIC DISPERSION EQUALIZATION APPARATUS IN HIGH-SPEED OPTICAL TRANSMISSION SYSTEM

(75) Inventors: Jae-Ho Song, Taejon (KR); Tae-Whan Yoo, Taejon (KR); Chang-Soo Park, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/454,415

(22) Filed: Dec. 3, 1999

(30) Foreign Application Priority Data

Dec. 3, 1998  (KR) ............................. 98-52950

(51) Int. Cl.⁷ ..................... H04B 10/00; H04B 10/06
(52) U.S. Cl. .................. 359/161; 359/154; 359/189; 359/158
(58) Field of Search ................. 359/161, 154, 359/189, 158

(56) References Cited

U.S. PATENT DOCUMENTS

| 4,261,639 A | 4/1981 | Kogelnik et al. ........ 350/96.15 |
|---|---|---|
| 5,559,920 A | 9/1996 | Chraplyvy et al. ......... 385/123 |
| 5,608,562 A | 3/1997 | Delavaux et al. ........... 359/161 |
| 5,798,853 A * | 8/1998 | Watanabe .................... 359/160 |
| 6,411,416 B1 * | 6/2002 | Ooi et al. .................... 359/124 |

OTHER PUBLICATIONS

Yamada et al., "Negative-Chirp Electroabsorption Modulator Using Low-Wavelength Detuning," *IEEE Photonics Technology Letters*, 7(10):1157–1158, 1995.

Sano et al., "Automatic dispersion equalization by monitoring extracted-clock power level in a 40-Gbit/s, 200-km transmission line," *European Conference on Optical Communication*, pp. 207–210, 1996.

Ishikawa and Ooi, "Demonstration of Automatic Dispersion Equalization in 40 Gbit/s OTDM Transmission," *European Conference on Optical Communication*, pp. 519–520, 1998.

* cited by examiner

Primary Examiner—Jason Chan
Assistant Examiner—David C. Payne
(74) Attorney, Agent, or Firm—Seed IP Law Group PLLC

(57) ABSTRACT

An automatic dispersion equalization apparatus in a high-speed optical transmission system, which performs continuous automatic dispersion equalization with the help of analog circuits without employing external digital processors by performing automatic compensation of optical fiber chromatic dispersion.

2 Claims, 4 Drawing Sheets

AUTOMATIC DISPERSION EQUALIZATION APPARATUS IN HIGH-SPEED OPTICAL TRANSMISSION SYSTEM

FIELD OF THE INVENTION

The present invention relates to automatic dispersion equalization apparatus in high-speed optical transmission systems, with bit rates exceeding several tens of Gbit/s.

BACKGROUND OF THE INVENTION

Recently, various communication service applications, for example, email, Internet, telebanking, teleshopping, videoconference, and other multimedia services have become required. To keep pace with such trends in the communication area, data transmission speed in optical communication has increased substantially. Currently, optical communication systems with 10 Gbit/s speed are widely used, and it is not difficult to expect optical communication systems with 40 Gbit/s or faster to be extensively used in the near future.

However, as the transmission speed of the optical communication systems increases to the range of several tens of Gbit/s, the chromatic dispersion effect of optical fibers becomes one of the most troublesome barriers against efficient high-speed data transmission. In fact, since the allowable amount variation of chromatic dispersion in 40 Gbit/s optical communication systems is within several tens of ps/nm, accurate chromatic dispersion compensation and equalization is required.

An alternative is to build a whole new optical communication systems with optical fibers that can handle chromatic dispersion efficiently. But the expense for this alternative is quite enormous. Linear chromatic dispersion compensation is becoming popular since a pre-installed optical fiber network can be used without additional expense. In linear chromatic dispersion compensation, optical transmitters and receivers are equipped with chromatic dispersion equalizers.

There are three conventional ways to compensate optical fiber chromatic dispersion.

First, linear passive chromatic dispersion method is available. Devices such as dispersion compensating fiber (DCF) and fiber grating implement it Second, non-linear active chromatic dispersion method is available. devices such as mid-span spectral inversion (MSSI) implement it.

Third, an electric compensation method such as pre-chip, dispersion supported transmission (DST), and duobinary coding which is implemented in transmitters and receivers is available.

In super high-speed optical network systems like systems with 40 Gbit/s, however, it is not easy to equalize chromatic dispersion because the allowable amount of chromatic dispersion is very small, and it is sensitive to environmental factor change like temperature.

Due to reasons stated above, an automatic dispersion equalizer that automatically compensates chromatic dispersion becomes a necessary device in super high-speed optical network systems.

Generally, a chromatic dispersion detector and a chromatic dispersion-variable equalizer are needed in order to implement automatic dispersion equalizer. A detector detects optimal chromatic dispersion value from the physical amount that is repeatedly changed by chromatic dispersion value. An equalizer has a capability of changing its chromatic dispersion value. ["Automatic dispersion equalization by monitoring extracted-clock power level in a 40-Gbit/s, 200 km transmission line", Sano, Akihide et al., $22^{nd}$ European Conference on Optical Communication '96, pp207~210]

Signals measured by the detector are supplied back to the chromatic dispersion equalizer and automatic dispersion equalization is performed. A well-known technique for detection is to measure error bit ratio, eye opening, and size of clock component of signals transmitted to an optical receiver. Until recently, chromatic dispersion has been measured by this technique and measured data has been provided to external processors for computations. Then, a controller controls the chromatic dispersion generator to equalize chromatic dispersion.

A widely used chromatic dispersion equalizer is an individual linear passive device such as dispersion compensating fiber (DCF), fiber grating, and planar lightwave circuit. Another technique in which feedback signals of a detector are supplied to a transmitter and the output signal frequency of optical source is modified have been introduced.

However, since these techniques require external measurement devices, a processor, and a controller, it is complicated to apply them to high-speed optical communication systems. In addition, from a system perspective, when the system is being used, the chromatic dispersion equalization may degrade performance of system.

SUMMARY OF THE INVENTION

The present invention provides an automatic dispersion equalization apparatus in a high-speed optical transmission system, which performs continuous automatic dispersion equalization without the help of external digital processors and performance degradation.

An automatic dispersion equalization apparatus in high-speed optical transmission system is composed of means for generating electric signals in accordance with chromatic dispersions and means for equalizing optical fiber chromatic dispersion by using the electric signals.

More particularly, the automatic dispersion equalization apparatus in a high-speed optical transmission system is composed of the following devices. A chromatic dispersion-variable equalizer adds chromatic dispersion to a positive positive (+) or a negative (−) direction with the help of a positive positive (+) or a negative (−) DC electric signal and thereby equalizes optical fiber chromatic dispersion. An optical coupler receives optical signals from the chromatic dispersion-variable equalizer and splits them into two paths. A chromatic dispersion generator generates chromatic dispersion to the positive (+) or negative (−) direction to add to the optical signals of the optical coupler.

A signal generator generates sine or trigonometrical functions to control chromatic dispersion of the dispersion generator. A photo detector converts the optical signals of the chromatic dispersion generator into electric signals. A narrow band amplifier amplifies electric signals of the photo detector. A narrow bandpass filter extracts clock components of signal speed from the amplified signals. An amplitude detector extracts magnitude variation from clock components extracted by the narrow bandpass filter. A phase shifter adjusts the phase of the output signal of the detector to match with phase of the signal of the signal generator. A multiplier detects the phase difference between the phase of the signals from the phase shifter and the phase of the signals from the signal generator. A low pass filter extracts DC components from output signals of the multiplier. An integrator continuously loads a positive (+) or negative (−) DC value to the chromatic dispersion-variable equalizer as the DC value of the signals from the low pass filter varies between positive (+) and negative (−).

BRIEF DESCRIPTION OF THE DRAWINGS

The embodiments of the present invention will be explained with reference to the accompanying drawings.

DETAILED DESCRIPTION OF THE PREFERRED EMBODIMENTS

Figure 1:
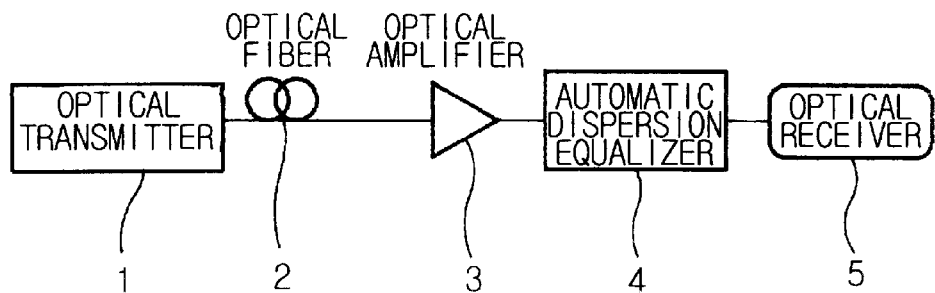
FIG. 1 is a block diagram illustrating an embodiment of a high-speed optical transmission system in accordance with the present invention.

FIG. 1 is a block diagram illustrating an embodiment of high-speed optical transmission system in accordance with the present invention.

As shown in the figure, high-speed optical communication is composed of an optical transmitter 1, an optical fiber 2, an optical amplifier 3, an automatic dispersion equalizer 4, and an optical receiver 5. The optical transmitter 1 modulates electric signals to non-return to zero (NRZ) or return to zero (RZ) format optical signals. The optical fiber 2 is the media that transmits the modulated signals. The optical amplifier 3 amplifies signals attenuated in the middle of transmission. The automatic dispersion equalizer 4 automatically equalizes chromatic dispersion of amplified signals. The optical receiver extracts data and clock component from output signals of automatic dispersion equalizer.

Figure 2:
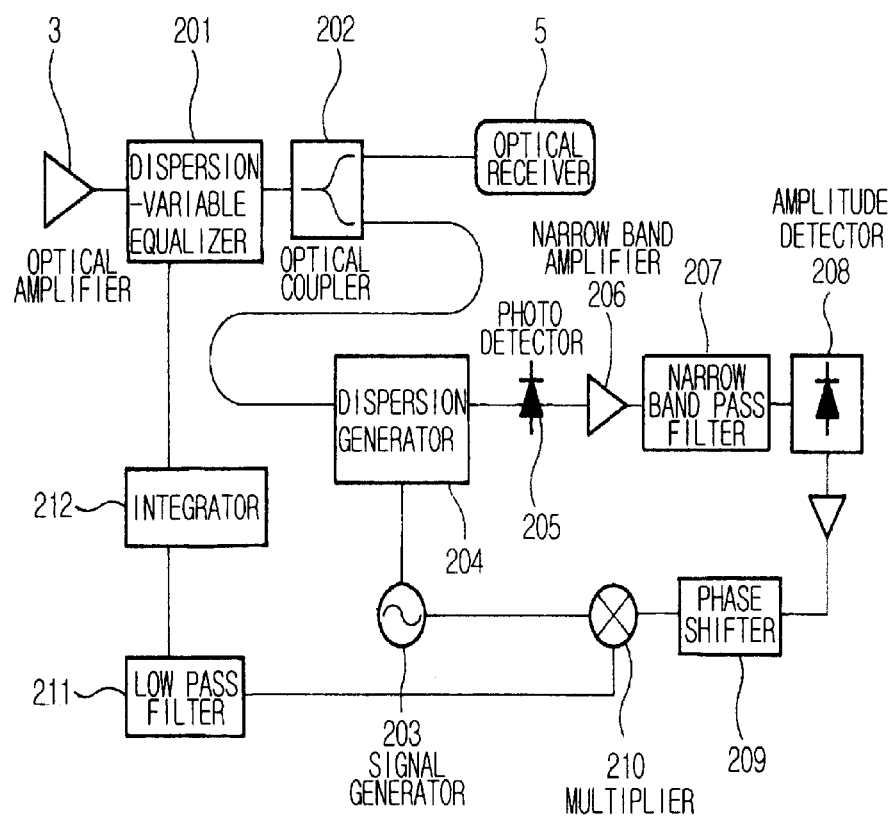
FIG. 2 is a block diagram illustrating an embodiment of the automatic dispersion equalization in a high-speed optical transmission system in accordance with the present invention.

FIG. 2 is a block diagram illustrating an embodiment of the automatic dispersion equalization in high-speed optical transmission system in accordance with the present invention.

As shown in the figure, an automatic dispersion equalizer includes a dispersion-variable equalizer 201, an optical coupler 202, a chromatic dispersion generator 204, a signal generator 203, a photo detector 205, a narrow band amplifier 206, a narrow bandpass filter 207, an amplitude detector 208, a phase shifter 209, a multiplier 210, a low pass filter 211, and an integrator 212. The dispersion-variable equalizer generates chromatic dispersion to a positive (+) or negative (−) direction to the output optical signals of the optical amplifier 3 with the help of positive (+) or negative (−) DC signals. The optical coupler 202 receives optical signals from the dispersion-variable equalizer and splits them into two paths. One is for the optical receiver 5, the other is for the automatic equalizer. The chromatic dispersion generator 204 generates sine or trigonometrical dispersion and adds to the optical chromatic dispersion of the optical coupler 202. The signal generator 203 generates sine or trigonometrical signals to control the dispersion generator 204. The photo detector 205 converts the output optical signals of the chromatic dispersion generator 204 into electric signals.

The narrow band amplifier 206 amplifies output signals of the photo detector 205. The narrow bandpass filter 207 extracts the clock component of signal speed from the amplified signals. The amplitude detector 208 extracts the magnitude of the clock component. The phase shifter 209 adjusts the phase of the output signal of the detector 208 to match it with the output signal of the signal generator 203. The multiplier 210 detects the phase difference between output signals of the phase shifter 209 and output signals of the signal generator 203. The low pass filter 211 extracts DC components from the output signals of the multiplier 210. The integrator 212 continuously loads a positive (+) or negative (−) DC value to the chromatic dispersion-variable equalizer 201 as the DC value of output of the low pass filter 211 varies between positive (+) and negative (−).

Referring to FIGS. 1 through 7, preferred embodiments of the automatic dispersion equalization apparatus for high-speed optical communication system in accordance with the present invention will be explained.

The chromatic dispersion-variable equalizer 201 equalizes chromatic dispersion caused by the transmission optical fiber 2. It is able to generate chromatic dispersion to a positive (+) or negative (−) direction by using electric signals. In the present invention, it generates appropriate chromatic dispersion by using the integrator 212 output signals.

The optical coupler 202 receives output optical signals from the chromatic dispersion-variable equalizer and sends them to the optical receiver 5 and to the chromatic dispersion generator 203. The dispersion generator is used independently with the optical main path in order to detect chromatic dispersion caused by the transmission optical fiber 2. It generates a sine or trigonometric format dispersion value continuously and adds it to optical signals of the optical coupler 202. The signal generator 203 generates a sine or trigonometric signal with certain magnitude and period to control dispersion generator 204. Since chromatic dispersion is continuously updated, the system in accordance with the present invention is able to detect chromatic dispersion variation while the system is running. It is implemented independently from optical link paths, and it does not cause any performance degradation.

The disclosed embodiment exploits the fact that the magnitude of clock components is varied according to chromatic dispersion. The first process to detect a clock signal component is to convert the optical signals into electric signals using photo detector 205. The process is to amplify and detect clock signal component using the narrow band amplifier 206 and the narrow bandpass filter 207. Finally, the magnitude of the signals is measured using the detector 208.

Figure 3:
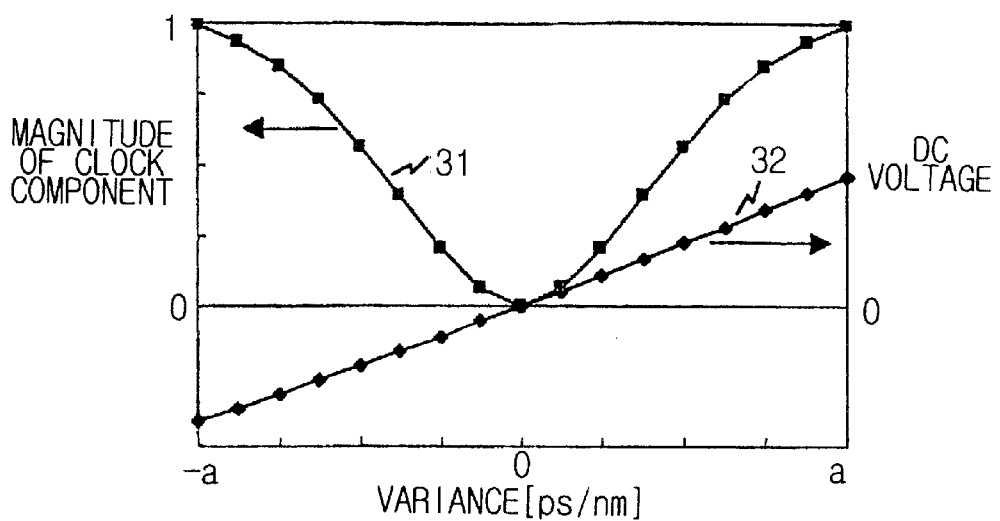
FIG. 3 is a graph illustrating an NRZ data clock component and dispersion-variable equalizer control signal with respect to dispersion.
Figure 4:
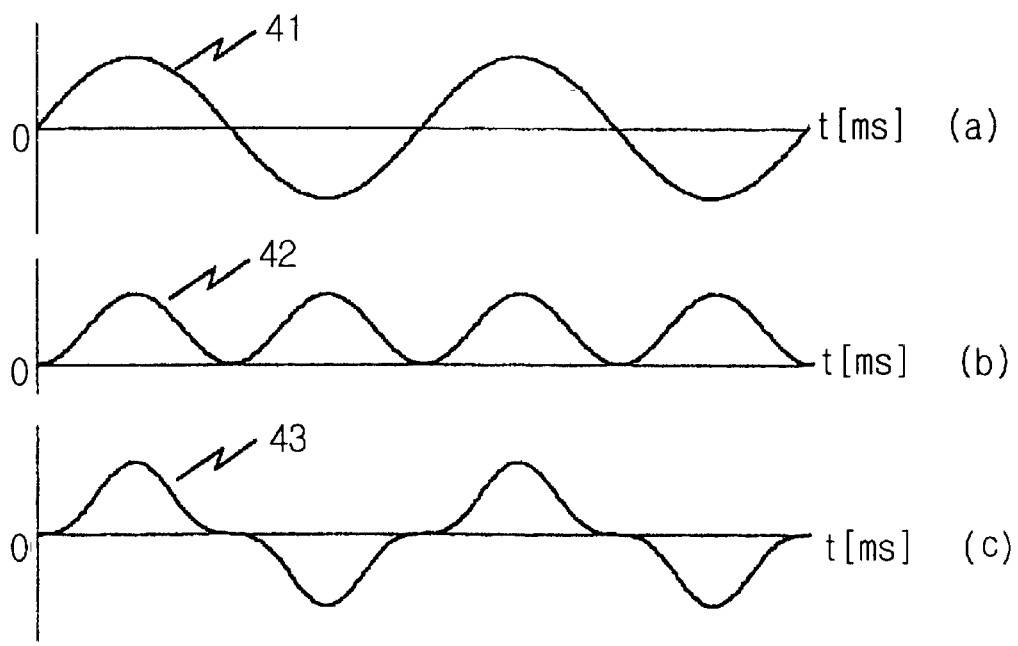
FIG. 4 is a diagram illustrating the input-output signal of the multiplier when chromatic dispersion has zero value after dispersion-variable equalizer.
Figure 5:
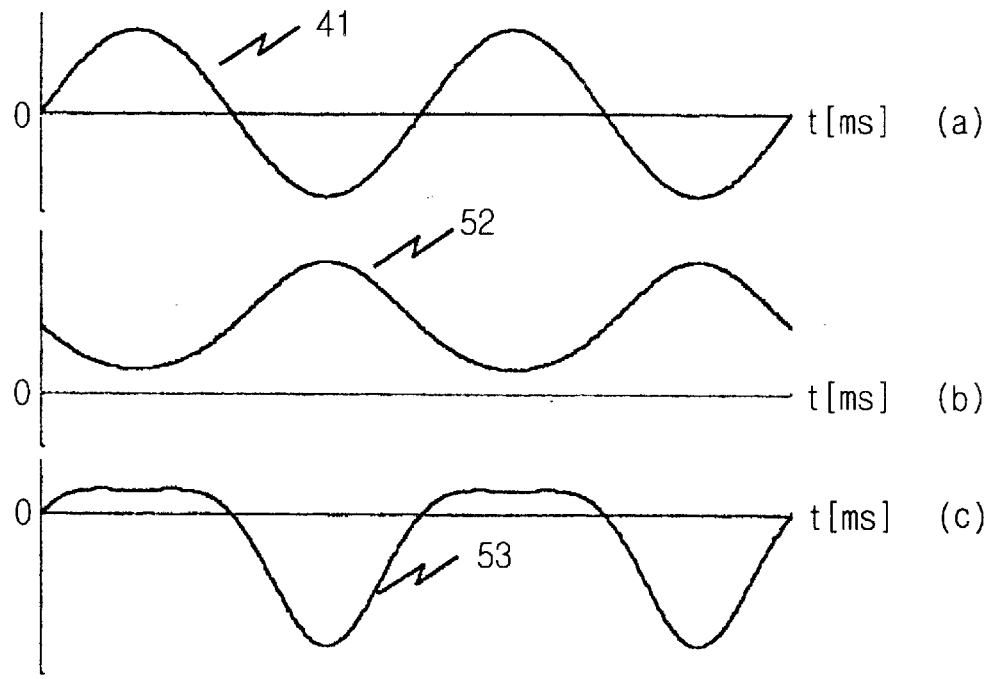
FIG. 5 is a diagram illustrating the input-output signal of the multiplier when chromatic dispersion has a negative value after dispersion-variable equalizer.
Figure 6:
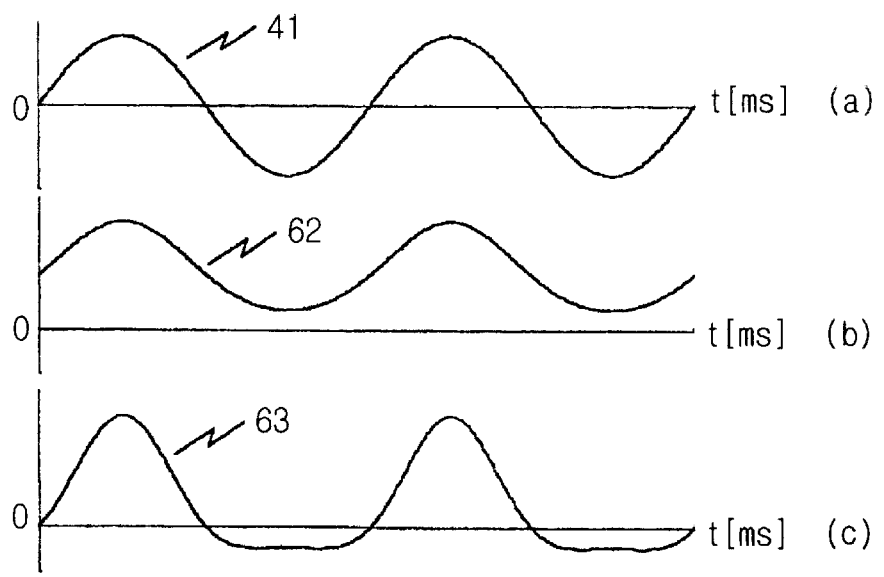
FIG. 6 is a diagram illustrating the input-output signal of the multiplier when chromatic dispersion has a positive value after dispersion-variable equalizer.

FIG. 3 shows a graph for illustrating the NRZ data clock component magnitude and dispersion equalizer control signal with respect to dispersion. When chromatic dispersion is equalized to zero, the magnitude gets close to zero. As chromatic dispersion gets increased to positive (+) or negative (−), the magnitude gets increased once and then decreased again. When the magnitude has a maximum value, the dispersion value becomes +a and −a. The value of 'a' varies as data transmission speed varies. As data transmission speed increases, the value of 'a' decreases remarkably.

The output signals of the amplitude detector 208 are delayed by the phase shifter 211 and as a result, phases of the two different input signals of the multiplier 210 become identical. The phase shifter 209 may be located in between the signal generator 203 and the multiplier 212.

The output signals of the multiplier 210 are supplied to the low pass filter 211 and converted into DC electric signals. As shown in FIG. 3, the DC electric signals 32 become zero when the chromatic dispersion value is equalized to zero. When the chromatic dispersion value increases toward the positive (+) and negative (−) direction, the DC electric signals increases toward positive (+) and negative (−) direction as well. Since the DC signals are supplied to the chromatic dispersion-variable equalizer 201 through integrator 212, the dispersion-variable equalizer 201 adjusts chromatic dispersion to perform dispersion equalization.

FIGS. 4a through 4c show a diagram for illustrating an input-output signal of the multiplier when the chromatic dispersion has a zero value after the dispersion-variable equalizer. FIG. 4a shows the output 41 of the signal generator 203 and FIG. 4b shows the output 42 of the detector 208. FIG. 4c shows the output 43 of the multiplier 210.

Signal 43 is the result of multiplication between signal 42 and signal 41. As shown in the figure, since signal 43 has a symmetrical pattern with respect to zero, the output signal passed through the low pass filter 211 becomes zero and doesn't control the chromatic dispersion-variable equalizer.

FIGS. 5a through 5c shows a diagram illustrating an input-output signal of the multiplier when chromatic dispersion has a negative value.

FIG. 5a shows the output 41 of the signal generator 203 and FIG. 5b shows the output 52 of the amplitude detector 208. FIG. 5c shows the output 53 of the multiplier 210.

As shown in the figure, since the difference between the phase of signals 41 and signals 52 is 180°, signal 53 generated by multiplication of the two signals results in inclination toward a negative (−) direction. After the signals 53 pass through the low pass filter 211, the output signals of the low pass filter have a negative (−) value. To equalize chromatic dispersion, the chromatic dispersion-variable equalizer 201 generates chromatic dispersion toward the positive (+) direction using the integrator 212.

FIGS. 6a through 6c show a diagram illustrating the input-output signal of the multiplier when chromatic dispersion has a positive value.

FIG. 6a shows the output 41 of the signal generator 203 and FIG. 6b shows the output 62 of the amplitude detector 208. FIG. 6c shows the output 63 of the multiplier 210.

As shown in the figure, since the difference between the phase of signals 41 and the phase of output signals 62 of the amplitude detector 208 is 0°, signal 63 generated by multiplication of the two signals results in inclination toward a positive (+) direction. After signals 62 pass through the low pass filter 211, the output signals of the low pass filter have a positive (+) value. To equalize chromatic dispersion, the chromatic dispersion-variable equalizer 201 generates chromatic dispersion toward a negative (−) direction using the integrator 212.

Figure 7:
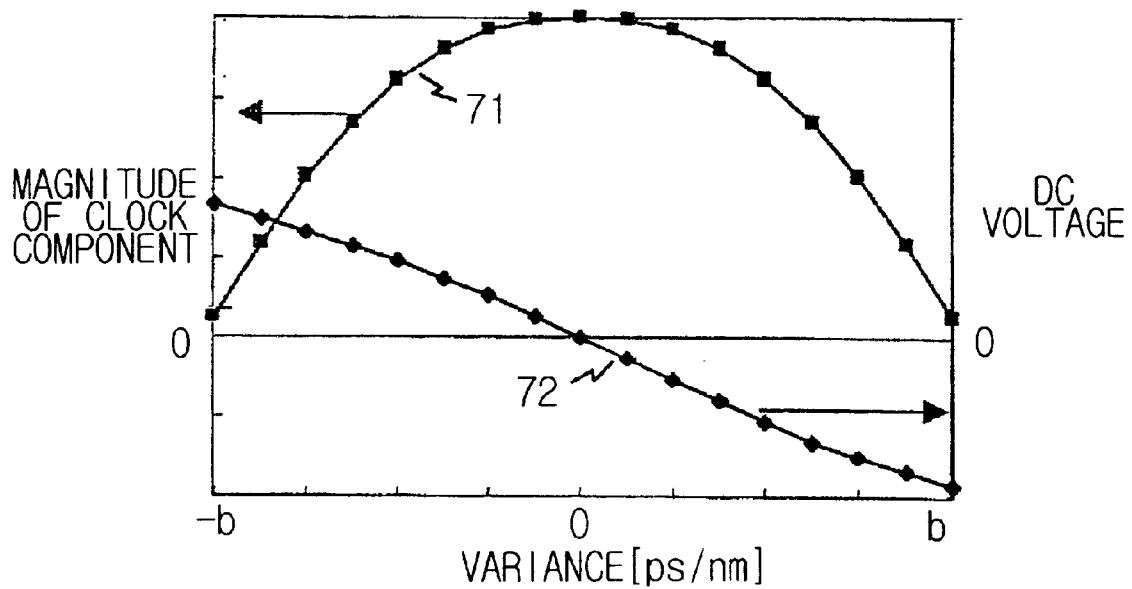
FIG. 7 is a graph illustrating the RZ data clock component and dispersion-variable equalizer control signal with respect to dispersion.

FIG. 7 is a graph illustrating the RZ data clock component and the chromatic dispersion generator control signal with respect to dispersion.

As shown in the figure, the RZ data clock component has the maximum value when chromatic dispersion is equalized to zero. It decreases as chromatic dispersion increases towards positive (+) direction or gets decreased toward negative (−) direction. It has almost the same value when ps/nm is beyond +b and below −b. Value b changes as data transmission speed varies and it rapidly decreases as data transmission speed increases.

The DC electric signal 72 of the low pass filter 211 has a zero value when chromatic dispersion is equalized to zero. It increases as the chromatic dispersion increases toward the positive (+) direction or decreases toward the negative (−) direction. Note that DC offset is required after the detector 208 in order to set DC electric signal 72 to zero when the clock component has the maximum value. Chromatic dispersion equalization is performed with the help of DC signals passing through the integrator 212 and the control of the dispersion-variable equalizer 201.

In addition, chromatic dispersion compensation according to the present invention was verified with OTDM and Duobinary data.

The present invention provides an automatic dispersion equalization apparatus in a high-speed optical transmission system, which performs continuous automatic dispersion equalization with the help of analog circuits without employing external digital processors.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An automatic dispersion equalization apparatus in a high-speed optical transmission system, comprising:

a chromatic dispersion-variable equalizer for adjusting chromatic dispersion to positive (+) or negative (−) direction with the help of a positive (+) or negative (−) DC signal and thereby equalizing optical fiber chromatic dispersion;

an optical 1:2 coupler for receiving output signals from said chromatic dispersion-variable equalizer and generating two optical signals, one optical signal for a main optical path and the other optical signal for an automatic dispersion equalizer;

a chromatic dispersion generator for generating chromatic dispersion to a positive (+) or negative (−) direction to add to said two optical signals of said optical 1:2 coupler;

a signal generator for generating signals to control chromatic dispersion of said chromatic dispersion generator to sine functions or trigonometrical functions with respect to zero;

a photo detector for converting the optical signals of said chromatic dispersion generator into electric signals;

a narrow band amplifier for amplifying electric signals of said optical detector;

a narrow bandpass filter for extracting clock components of signal speed from said amplified signals;

an amplitude detector for extracting magnitude variation from clock components extracted by said narrow bandpass filter;

a phase shifter for adjusting phase of an output signal of said detector to match with the phase of the signals of said signal generator;

a multiplier for detecting a phase difference between the phase of the signals of said phase shifter and the phase of the signals of said signal generator;

a low pass filter for extracting DC components from output signals of said multiplier; and an integrator for continuously loading positive (+) or negative (−) DC value to said chromatic dispersion-variable equalizer as a DC value of signals of said low pass filter varies between positive (+) and negative (−).

2. The automatic dispersion equalization apparatus of claim 1, wherein said chromatic dispersion generator continuously changes chromatic dispersion without depending upon said chromatic dispersion-variable equalizer.

\* \* \* \* \*